US012442247B2

(12) United States Patent
Nehls-Eller

(10) Patent No.: US 12,442,247 B2
(45) Date of Patent: Oct. 14, 2025

(54) DEVICE FOR SEPARATING PERSONS IN A SEPARATING REGION, AND PERSON SEPARATING DEVICE

(71) Applicant: ELKA TORANTRIEBE GMBH U. CO. BETRIEBS KG, Toenning (DE)

(72) Inventor: Torben Nehls-Eller, Mildstedt (DE)

(73) Assignee: ELKA TORANTRIEBE GMBH U. CO. BETRIEBS KG, Toenning (DE)

( * ) Notice: Subject to any disclaimer, the term of this patent is extended or adjusted under 35 U.S.C. 154(b) by 0 days.

(21) Appl. No.: 18/726,794

(22) PCT Filed: Jan. 5, 2023

(86) PCT No.: PCT/DE2023/200002

§ 371 (c)(1),
(2) Date: Jul. 4, 2024

(87) PCT Pub. No.: WO2023/131382

PCT Pub. Date: Jul. 13, 2023

(65) Prior Publication Data

US 2025/0067121 A1 Feb. 27, 2025

(30) Foreign Application Priority Data

Jan. 7, 2022 (DE) ..................... 10 2022 100 279.9

(51) Int. Cl.
*E06B 11/08* (2006.01)
*E01F 13/06* (2006.01)

(52) U.S. Cl.
CPC .............. *E06B 11/08* (2013.01); *E01F 13/06* (2013.01)

(58) Field of Classification Search
CPC .......... E06B 11/08; E06B 11/085; E06B 3/90; E06B 3/903; E06B 3/906; E01F 13/06
See application file for complete search history.

(56) References Cited

U.S. PATENT DOCUMENTS

| | | | | |
|---|---|---|---|---|
| 5,605,015 A * | 2/1997 | Uhl | ........................ | E06B 11/08 49/47 |
| 6,012,252 A | 1/2000 | Kocznar et al. | | |

(Continued)

FOREIGN PATENT DOCUMENTS

| | | |
|---|---|---|
| CH | 646 755 A5 | 12/1984 |
| DE | 27 58 971 A1 | 7/1978 |

(Continued)

*Primary Examiner* — Marcus Menezes
(74) *Attorney, Agent, or Firm* — Norman B. Thot

(57) ABSTRACT

A device for separating persons in a separating region includes a stationary holding apparatus, blocking beams, and a rotational receiving portion. The rotational receiving portion has blocking beam receiving portions to moveably receive a blocking beam. When the rotational receiving portion rotates, one blocking beam pivots out of the separating region while another pivots into the separating region to separate out a person. One of the blocking beams has a coupling device. The holding apparatus has a control guide to guide the coupling device. The control guide mechanically corresponds to, receives, and imparts an additional movement to the coupling device when the rotational receiving portion is rotated so that an additional movement relative thereto is imparted to the blocking beam via the control guide, and one blocking beam is pivoted into the separating region with a delay and/or is pivoted out of the separating region in an accelerated manner.

15 Claims, 13 Drawing Sheets

(56) References Cited

U.S. PATENT DOCUMENTS

| | | | | |
|---|---|---|---|---|
| 8,181,392 | B1 * | 5/2012 | Farber | E01F 13/06 49/234 |
| 8,522,477 | B2 * | 9/2013 | Burgin | E06B 11/08 49/46 |
| 10,006,247 | B2 * | 6/2018 | Ebner | E05F 15/60 |
| 2006/0000144 | A1 | 1/2006 | Wallersdorfer et al. | |
| 2009/0307976 | A1 | 12/2009 | Bürgin et al. | |
| 2017/0306698 | A1 | 10/2017 | Ebner | |

FOREIGN PATENT DOCUMENTS

| | | | |
|---|---|---|---|
| DE | 198 19 901 | A1 | 11/1999 |
| DE | 20 2005 012 659 | U1 | 11/2005 |
| EP | 1 609 942 | A1 | 12/2005 |
| EP | 3 239 451 | A1 | 11/2017 |
| WO | WO 97/18379 | A1 | 5/1997 |

* cited by examiner

DEVICE FOR SEPARATING PERSONS IN A SEPARATING REGION, AND PERSON SEPARATING DEVICE

CROSS REFERENCE TO PRIOR APPLICATIONS

This application is a U.S. National Phase application under 35 U.S.C. § 371 of International Application No. PCT/DE2023/200002, filed on Jan. 5, 2023 and which claims benefit to German Patent Application No. 10 2022 100 279.9, filed on Jan. 7, 2022. The International Application was published in German on Jul. 13, 2023 as WO 2023/131382 A1 under PCT Article 21(2).

FIELD

The present invention relates to a device for separating persons in a separating region, the device comprising a holding apparatus which can be installed in a stationary manner, a rotational receiving portion which can be rotated in a rotational plane about a rotational axis relative to the holding apparatus, and at least two blocking beams, wherein the at least two blocking beams are received in respective blocking beam receiving portions of the rotational receiving portion, each blocking beam receiving portion corresponding to a respective blocking beam, so that when the rotational receiving portion rotates in the rotational plane about the rotational axis, one of the blocking beams is pivoted out of the separating region and another of the blocking beams is pivoted into the separating region, and thus one person can be separated from the persons when passing through the separating region. The present invention furthermore relates to a person separating device comprising a main body, a passage, and a device of the type mentioned.

BACKGROUND

Known devices for separating persons, or also person separating devices, are typically designed so that a turnstile is received at an axis which is arranged askew in space and which is designed so as to be rotatable about the corresponding axis. A turnstile of this kind comprises different blocking beams, which in each case pivot into and out of a separating region in the event of a rotation of the turnstile. The arrangement of different blocking beams relative to one another is in this case fixed on account of the rigid design of corresponding turnstile systems so that in particular individual blocking beams that are not used in the separating region for separating persons are in the way, in particular in the foot region of a person walking through the turnstile, and hit, for example, the knee and/or shin. Bringing luggage, for example, a rucksack, through these rigid turnstile systems is also correspondingly difficult.

Turnstile systems are also known in which, for example, in the context of an emergency function or also a service function, individual blocking beams can be released via a tool and can be pivoted out of the separating region.

DE 198 19 901 A1 describes a turnstile system for the passage of persons in which respective blocking arms can be unlocked for emergency unlocking via a pin-shaped unlocking device, and can then be pivoted out of the separating region about an axis.

DE 20 2005 012 659 U1 describes a turnstile where, in the case of a power failure, blocking arms can be rotatably released. The blocking arms are spring-loaded for this purpose and can be unlocked via their solenoids.

DE 27 58 971 A1 describes a turnstile in which a mechanical turnstile controller comprises spring-loaded latching points and in addition a return travel protection device.

CH 646 755 A5 describes a turnstile in which respective blocking beams can be mechanically unlocked and pivoted about an axis relative to a rotational receiving portion.

SUMMARY

An aspect of the present invention is to improve on the prior art.

In an embodiment, the present invention provides a device for separating persons in a separating region. The device includes a holding apparatus which is installable in a stationary manner, at least two blocking beams, and a rotational receiving portion which is rotatable in a rotational plane about a rotational axis relative to the holding apparatus. The rotational receiving portion comprises blocking beam receiving portions each of which is configured to receive one of the at least two blocking beams. Each blocking beam receiving portion corresponds to one of the at least two blocking beams so that, when the rotational receiving portion rotates in the rotational plane about the rotational axis, one of the at least two blocking beams is pivoted out of the separating region and another one of the at least two blocking beams is pivoted into the separating region so as to thereby separate one person from the persons passing through the separating region. At least one of the at least two blocking beams comprises a respective coupling device on a rotational receiving portion side. The at least one of the at least two blocking beams is received in its corresponding blocking beam receiving portion in a movable manner relative to the rotational receiving portion. The holding apparatus comprises a control guide for guiding the respective coupling device. The control guide mechanically corresponds to the respective coupling device, receives the respective coupling device, and imparts an additional movement to the respective coupling device when the rotational receiving portion is rotated so that an additional movement relative to the rotational receiving portion is imparted to the at least one of the at least two blocking beams via the control guide, and the at least one of the at least two blocking beams is at least one of pivoted into the separating region with a delay and is pivoted out of the separating region in an accelerated manner.

BRIEF DESCRIPTION OF THE DRAWINGS

The present invention is described in greater detail below on the basis of embodiments and of the drawings in which.

DETAILED DESCRIPTION

Figure 1:
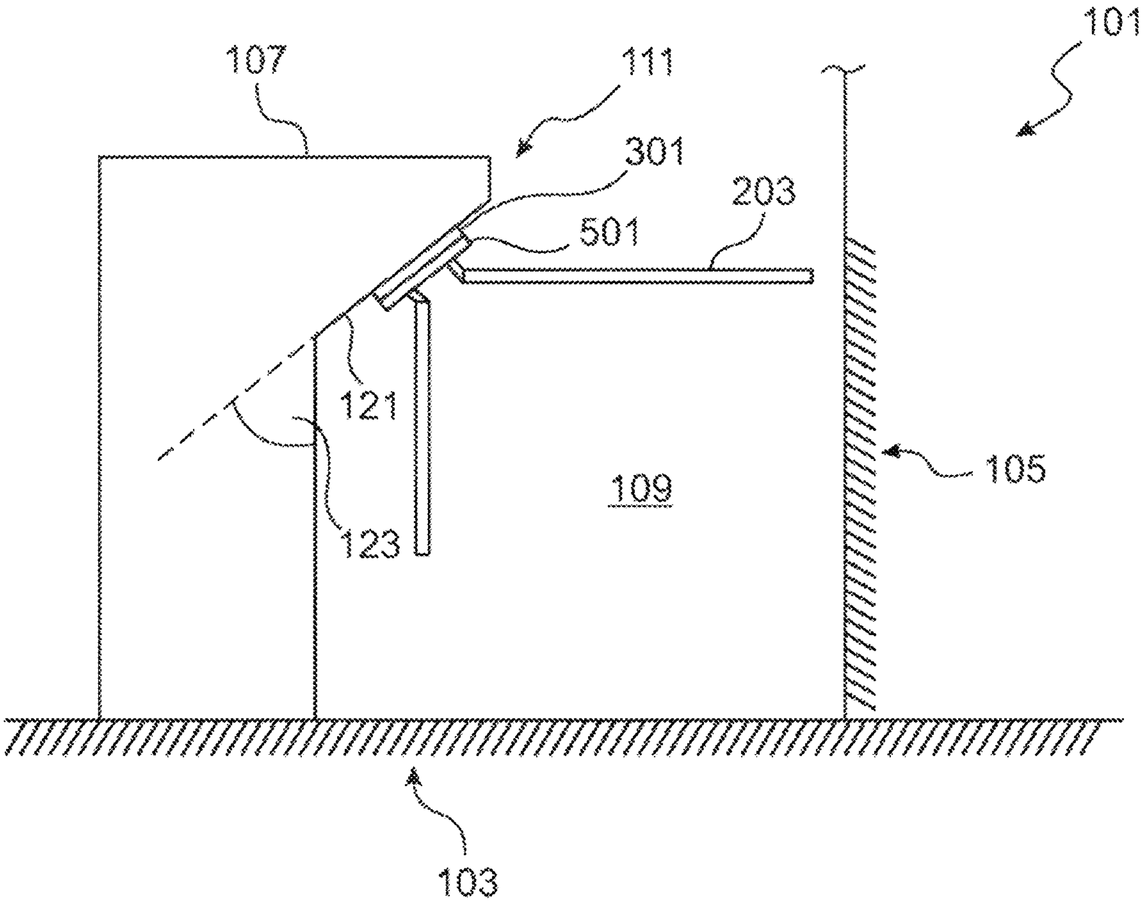
FIG. 1 is a schematic front view of a turnstile system comprising a turnstile and a passage.
Figure 2:
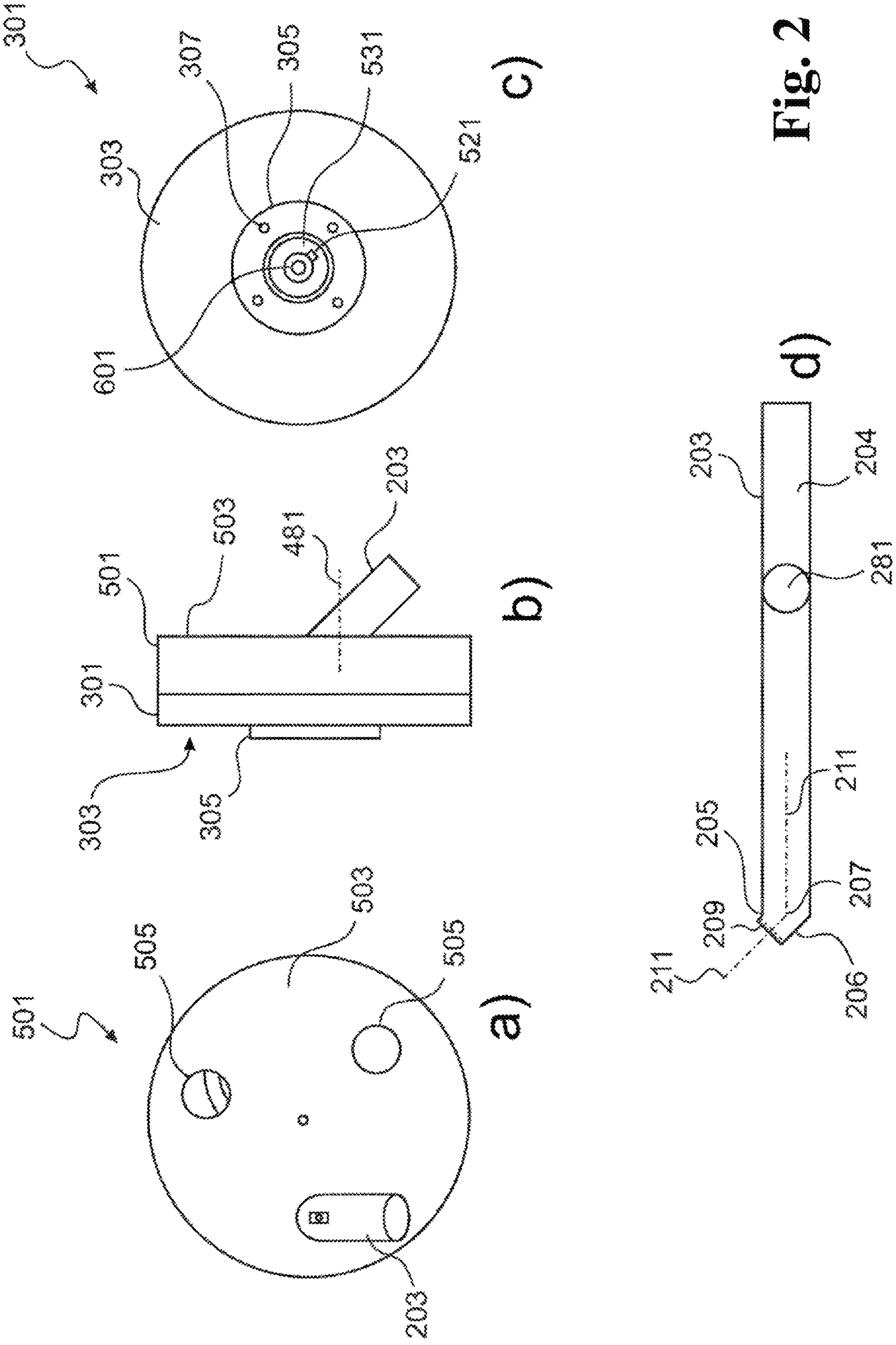
FIG. 2*a*) is a plan view of a functional unit of the turnstile of FIG. 1 comprising a base plate and a hub.
FIG. 2*b*) is a side view of the functional unit of FIG. 2*a*)
FIG. 2*c*) is a rear view of the functional unit of FIG. 2*a*)
FIG. 2*d*) shows a blocking beam of the turnstile of FIG. 1.

The present invention provides a device for separating persons in a separating region, the device comprising a holding apparatus which can be installed in a stationary manner, a rotational receiving portion which can be rotated in a rotational plane about a rotational axis relative to the holding apparatus, and at least two blocking beams, wherein the at least two blocking beams are received in respective blocking beam receiving portions of the rotational receiving portion, each blocking beam receiving portion corresponding to a respective blocking beam so that when the rotational receiving portion rotates in the rotational plane about the rotational axis, one of the blocking beams is pivoted out of the separating region and another of the blocking beams is pivoted into the separating region, and thus one person can be separated from the persons when passing through the separating region, wherein at least one of the blocking beams has a respective coupling device on the rotational receiving portion side, and the at least one blocking beam is received in the respective blocking beam receiving portion in a movable manner relative to the rotational receiving portion, and the holding apparatus has a control guide for guiding the respective coupling device, wherein the control guide mechanically corresponds to the respective coupling device and receives the respective coupling device, and the control guide imparts an additional movement to the respective coupling device when the rotational receiving portion is rotated so that an additional movement relative to the rotational receiving portion is imparted to the respective blocking beam via the control guide, and the respective blocking beam is pivoted into the separating region with a delay, and/or pivoted out of the separating region in an accelerated manner.

This arrangement makes it possible to design a device according to the present invention so that the separating region is kept free as extensively as possible, in the case of a rotation of the rotational receiving portion, in that corresponding blocking beams, which are not directly used for separating a person, are pivoted out of the separating region as far as possible at this time. Depending on the design of the control guide and the respective coupling device, it is in this case possible to achieve that only one of the blocking beams is arranged in the separating region and other, at this time unused, blocking beams are pivoted entirely out of the separating region.

The following terms and expressions will be explained at this point:

A “device for separating persons” is a device which makes it possible to separate persons, in a separating region, from other persons, for example, from a group of persons. A device of this kind is, for example, a turnstile which is arranged at a separating region and thus serves, with corresponding blocking beams, to separate a respective person from a group. Devices of this kind are also known as turnstile systems. In this case, a device of this kind for separating can also be a retrofit device in order to, for example, supplement a passage or to access to a corresponding useful region, around the separating region, with a corresponding device.

A “separating region” is the region along, for example, a passage or the passage itself, in which the separation of the persons is physically performed, for example, a separating region of this kind is arranged in a narrow passage so that the device for separating persons reaches into the passage and thus makes the passage a separating region. A separating region of this kind is, for example, an access area to a swimming pool, an event, or company or business premises, so that access to precisely these devices is regulated using the device for separating persons.

A “holding apparatus” is the component of the device for separating persons which is installed, for example, at a holding point, a wall, or a receiving portion, in order to orient the device for separating persons in a correct position and a correct angular orientation according to its planned function. In this case, “can be installed in a stationary manner” means that a holding apparatus of this kind is installed in a wall or in a holding pillar so that a stationary position of the device for separating persons relative to the surroundings, for example, relative to the building structure, is achieved. A holding apparatus of this kind is, for example, a base plate which receives a rotational receiving portion in a rotatable manner.

A “rotational receiving portion” describes the component of the device for separating persons which is arranged so as to be rotatable relative to the holding apparatus, specifically in a rotational plane, about a rotational axis. A rotational receiving portion of this kind in this case also serves to receive corresponding blocking beams and is, for example, a hub which is rotatably received on a base plate. A “rotational plane” is in this case a rotation of the rotational receiving portion relative to the holding apparatus. The “rotational axis” is in contrast positioned orthogonally to the rotational plane so that the geometric allocation of the six degrees of freedom of the rotational receiving portion takes place via the rotational plane and the rotational axis. In practice, of the six degrees of freedom available, for example, only some degrees of freedom are used, for example, the rotation about the rotational receiving portion, and in particular a corresponding, usually coupled, movement of a blocking beam or a plurality of blocking beams. The corresponding rotational plane and also the rotational axis are in this case mathematically idealized and may exhibit some deviations, for technical reasons, both in their orientation and straightness so that, for example, a rotational axis is defined by the fact that the rotational receiving portion is rotatable around a mounting, and in this case has a certain amount of tolerance relative to the mathematically exact axis.

A "blocking beam" can be a rod-shaped or also bow-shaped arrangement on the device for separating persons which is received at the rotational receiving portion. A device of this kind for separating persons typically comprises two or also more blocking beams, for example, a corresponding turnstile comprises three blocking beams, wherein in the case of correspondingly larger devices or correspondingly larger systems comprising such devices, four, five or six blocking beams can also be provided. In this case, a blocking beam of this kind is formed, for example, of a pipe or a round or differently shaped, usually prismatic, starting material. In this case, a blocking beam of this kind does not have to consist of a single strand, but can rather, for example, also be designed as a U-shaped bracket in order to be able to deploy a larger projected surface relative to a person to be separated.

A "blocking beam receiving portion" is, for example, a mounting or a differently designed receiving portion for a respective blocking beam on the rotational receiving portion so that the blocking beam is fixedly arranged relative to the rotational receiving portion, in some degrees of freedom, via the blocking beam receiving portion, but retains at least one degree of freedom so that, for example, a respective blocking beam is designed to be rotatable or also pivotable relative to the rotational receiving portion.

In this case, "corresponding" describes that a relevant end region of a blocking beam, and a blocking beam receiving portion associated with the blocking beam in question, are designed to match one another geometrically so that the blocking beam can be physically received in the blocking beam receiving portion.

A "rotation/rotating" of the rotational receiving portion describes the process in which the device for separating persons is set into operation, specifically, the rotational receiving portion and thus also the corresponding blocking beams are moved in rotation about the rotational axis.

The process of one of the blocking beams being "pivoted out" of the separating region and another of the blocking beams being "pivoted into" the separating region describes that a respective blocking beam is physically taken out of the separating region and another of the blocking beams is physically introduced into the separating region so that the blocking beam pivoted into the separating region in each case serve to separate a person, wherein a blocking beam pivoted out of the separating region in each case, for example, releases a further path for a person who has just been separated.

A "passage/passing" of a person describes the physical activity of the person of moving through the separating region or a physically present passage, for example, on foot.

A "coupling device" is, for example, a mechanical, in particular multi-part, device which is arranged in the extension of the respective blocking beam and which, for example, serves to mechanically couple the blocking beam to the holding apparatus and to carry out driving of the blocking beams, and specifically so that a mechanically desired movement is transferred to the respective blocking beam and/or initiated for the respective blocking beam.

"Movable/movably" describes the fact that a respective blocking beam retains at least one degree of freedom relative to the rotational receiving portion so that the blocking beam can change its position and/or angular position relative to the rotational receiving portion, in particular when the rotational receiving portion is rotated.

A "control guide" is a guide which is assigned to the holding apparatus and which acts mechanically on the coupling device and can impart a corresponding movement to the coupling device and thus to the respective blocking beam. A control guide of this kind is, for example, a slotted guide, a control groove, or a different type of guide, which performs its function, for example, via a form-fitting connection.

The fact that in this case the control guide "mechanically corresponds to the respective coupling device" describes, for example, that the control guide and the coupling device are matched to one another so that, for example, a form-fitting connection having a required play and/or a required tolerance exists, but that said tolerance is, for example, so narrow that the blocking beam is guided as far as possible free of play.

An "additional movement" describes a movement of the respective blocking beam according to the degree of freedom still provided for the blocking beam, relative to the rotational receiving portion, wherein the additional movement can exist both translationally and also rotationally, and/or rotationally in different axes.

If a respective blocking beam is pivoted into the separating region "with a delay", then, for example, the movement of the respective blocking beam is changed via the additional movement so that in the case of a rotation of the rotational receiving portion, the respective blocking beam remains outside the separating region for a longer time period with respect to and/or in relation to a full rotation of the rotational receiving portion and pivots into the separating region only at a point in time when, for example, a further blocking beam, via which a person has already been separated, already pivots out of the separating region. In contrast thereto, the fact that the respective blocking beam is pivoted out of the separating region "in an accelerated manner" describes the situation where the movement of the respective blocking beam, via the additional movement, is accelerated and/or its speed is increased so that a corresponding blocking beam leaves the separating region as early as possible, for example, as early as possible after a person has been separated, so that the separating region is released as early as possible and is usable in as large a cross-section as possible, for example, when the person leaves the separating region.

In order to be able to design the device for separating persons to be as simple as possible and, for example, to equip the holding apparatus with the necessary functionalities via known manufacturing methods, the control guide is designed to be engraved in the holding apparatus, in particular substantially in the direction of the rotational axis, in particular as a groove-shaped depression in the holding apparatus, and/or is designed to protrude from the holding apparatus, in particular as a rib-shaped protrusion out of the holding apparatus.

When the holding apparatus is thus, for example, produced as a cast component, a corresponding engraving, depression or also a corresponding protrusion can already be provided, for the casting method, in a molding tool. Likewise, in the case of processing the holding apparatus via machining, a corresponding groove-shaped depression can, for example, be milled in, or a corresponding protrusion can be produced by removing remaining material. The control guide is in this case in particular introduced substantially in the direction of the rotational axis so that the processing of the holding apparatus is additionally simplified.

In this case, "substantially in the direction of the rotational axis" describes not only a direction which extends mathematically exactly along the rotational axis, but rather, for example, also a technically-related deviation of in particular −10° to +10° or a desired deviation of, for example, −45° to +45°, so that, for example, the control guide can be designed, by way of the corresponding angular orientation relative to the rotational axis, so that the control guide, for example, follows the additional movement of a corresponding blocking beam without triggering a jamming or a mechanical blocking.

In this case, "engraved" describes a recess of the corresponding control guide relative, for example, to a surface of the holding apparatus, so that the control guide is developed as a material removal and/or volume removal from the holding apparatus, wherein a "groove-shaped depression" describes a specific design of the control guide, for example, as a milled groove or pressed-in groove or control groove.

In contrast, "protruding" in this case describes that a protruding control guide of this kind comprises more material relative, for example, to a surface of the holding apparatus, i.e., also more volume relative to the holding apparatus.

In this case, a "rib-shaped protrusion" is, for example, a specific embodiment of a protruding control guide of this kind which is designed, for example, as a rib that is cast on the corresponding holding apparatus, or a rib that is worked out on the holding apparatus correspondingly by milling.

In one embodiment of the present invention, the control guide has an alternating curvature along a control guide course, wherein the control guide is in particular assigned an auxiliary guide for assisted guidance of the coupling device, the auxiliary guide is in supporting engagement with the coupling device at points of singularity, at curvature jumps and/or in regions of small curvature of the control guide course, and guides the coupling device in a supporting manner.

Via the alternating curvature of the control guide along a control guide course, in conjunction with the respective coupling device of the respective blocking beam, the respective blocking beam can be mechanically influenced so that an alternating additional movement about a complete extent of a rotation of the rotational receiving portion is imparted to the respective blocking beam so that, for example, a respective additional movement is imparted to a respective blocking beam in a respective angular position about the rotational axis.

In the event of such an alternating curvature, corresponding movements or correlations between the coupling device and the control guide might in this case have a tendency to jam or to self-lock so that a correspondingly assisted guidance of the coupling device can take place via an auxiliary guide.

A "control guide course" describes the geometric progression of the control guide along, for example, a length of the control guide, wherein the control guide course in this case is in no way straight, but is rather designed according to an alternating curvature so that, for example, a control guide has a meandering, heart-shaped or curved form along particular regions of the control guide course.

An "alternating curvature" in this case describes exactly these different courses, which in any case do not have to be straight, but rather comprises, for example, straight regions, slightly curved regions, significantly curved regions, and very significantly curved regions.

An "auxiliary guide" is, for example, a further depression or also a further protrusion which is arranged at a distance from the control guide course and thus at a distance from the control guide, wherein in this case the auxiliary guide is also designed to mechanically correspond to the coupling device and, for example, prevents a jamming of the coupling device and thus a jamming of the respective blocking beam in that, for example, a spacing of the auxiliary guide relative to the control guide at a respective point serves as a lever arm in order to be able to apply a corresponding force against a jamming.

In this case, "supported guidance/guiding" describes exactly this process, specifically that the coupling device is "supported" so that jamming in the control guide, for example, at points of singularity, jumps in curvature, and/or regions of slight curvature, is effectively prevented.

"Points of singularity" describes mathematical jumps in definition or gaps in definition so that, for example, in the case of a heart-shaped course of the control guide, there is a pronounced curvature in the upper region of the imaginary heart, which then leads into a reverse point and changes into a second significant curvature arranged mirror-symmetrically to the first significant curvature, wherein, for example, in the case of a geometrically designed heart, an angle change about, for example, approximately 90° is performed. The point of the angle change in this case describes the point of singularity, wherein the curvature of the course is not clearly defined at this point. Corresponding disruptions of the mechanical progression of the coupling device in the control guide or on the control guide may occur at such a point of singularity so that, for example, a respective blocking beam would jam or the device itself can lock completely.

Similarly to such points of singularity, a "jump in curvature" can lead to the same technical restrictions, specifically if, for example, a slight curvature transitions into a strong curvature, and in the process a gradual, but in the mathematical sense non-differentiable, transition exists.

A "region of slight curvature" in contrast describes a region of the control guide along the control guide course in which the curvature is so slight that, for example, a jamming of a blocking beam and/or of the respective coupling device is achieved by an undefined state of the coupling device relative to the control guide. In this case, it can also be said that the coupling device "wobbles" in the control guide so that a clear and distinct guidance results. The auxiliary guide in this case serves to reliably overcome such regions of the control guide if, for example, a small curvature is necessary for the desired additional movement of the respective control beam.

In order to receive the respective blocking beam securely and nonetheless movably on the rotational receiving portion, the blocking beam receiving portion comprises a joint for movably receiving the respective blocking beam, wherein the joint is in particular a rotary joint, wherein a blocking beam rotational axis is arranged substantially in parallel with the rotational axis and/or the joint is a swivel joint, wherein a blocking beam swivel axis is arranged to be substantially in parallel with the rotational plane and/or substantially orthogonal to the rotational axis.

Such a joint provides a mathematically correct and precise allocation of the respective blocking beam to the rotational receiving portion, wherein a rotary joint serves to receive the blocking beam in a rotatable manner relative to the rotational receiving portion, in particular so that it is rotatable in parallel with the rotational axis. The respective blocking beam can thus, for example, perform an additional movement so that a rotational movement, i.e., a rotatory movement, in parallel with the rotational axis, is imparted to the blocking beam.

In contrast, a swivel joint serves for a respective blocking beam to perform a swivel movement about a blocking beam swivel axis, relative to the rotational receiving portion, as the additional movement, wherein the blocking beam swivel axis is arranged to be substantially in parallel with the rotational plane and/or substantially orthogonal to the rotational axis. A coupling movement likewise consisting of, for example, a blocking beam rotational movement and a blocking beam swivel movement can also be performed, for example, if a joint having both mechanical degrees of freedom is used.

A "joint" is a mechanical connection in which, for example, one degree of freedom or also a plurality of degrees of freedom are released in a defined manner, wherein other degrees of freedom are locked or blocked. A joint of this kind is, for example, a hinge, a ball joint, or also a rotary joint.

A "rotary joint" is a joint which, for example, allows for a rotatory movement of the blocking beam in parallel with the rotational axis, wherein in this case the rotary joint can in particular also be designed as a functional unit together with the respective blocking beam receiving portion, in the rotational receiving portion, for example, as a simple plain bearing.

A "blocking beam rotational axis" in this case describes the axis about which the blocking beam is rotatably received relative to the rotational receiving portion, wherein "substantially in parallel" with the rotational axis in this case describes that the blocking beam rotational axis can have a technically necessary or technically induced deviation of, for example, −15° to +15°, relative to the rotational axis, i.e., in this case "parallel" is not a mathematically precise term.

A "swivel joint" describes a joint which allows an additional movement of the respective blocking beam relative to the rotational receiving portion so that a degree of freedom is provided so that the respective blocking beam can change its angle relative to the rotational plane.

A "blocking beam swivel axis" in this case describes the joint axis of the swivel joint analogously to the above-described blocking beam rotational axis but having a different reference axis.

In a further embodiment of the present invention, the coupling device comprises a rotary coupling guide that is arranged eccentrically to the blocking beam rotational axis so that, when the rotational receiving portion is rotated and when the eccentrically arranged rotary coupling guide of the coupling device is guided in the control guide, a rotational additional movement about the blocking beam rotational axis is imparted to the respective blocking beam.

A coupling device designed in this way allows, in interaction with the respective control guide, a defined guidance of the respective blocking beam about the blocking beam rotational axis so that, in particular in the case of this embodiment in conjunction with a rotary joint, a reliable functioning of the device is provided.

In this case, "eccentrically to the blocking beam rotational axis" describes the situation where the rotary coupling guide has a reference axis which, although substantially in parallel with the blocking beam rotational axis, is arranged to be spaced apart therefrom. A lever arm is thus produced between the blocking beam rotational axis and a corresponding reference axis of the rotary coupling guide. A movement of the reference axis with respect to the blocking beam rotational axis in this case leads to a rotational movement of the coupling device so that, in a manner functionally similar to a crank drive, a rotary drive of the respective blocking beam is made possible, specifically via the control guide.

A "rotary coupling guide" is in this case, for example, a pronounced end region of the coupling device which serves as a drive lever with respect to the blocking beam rotational axis so that a rotary coupling guide guided in the control guide triggers a rotation of the blocking beam about the blocking beam rotational axis.

In order to enable an additional movement of the respective blocking beam about the blocking beam swivel axis in a technically reliable manner, the coupling device comprises an extension of the blocking beam on the rotational receiving portion side so that upon rotation of the rotational receiving portion and upon guidance of the extension of the coupling device on the rotational receiving portion side, in the control guide, a rotatory additional movement about the blocking beam swivel axis is imparted to the respective blocking beam.

An "extension" of the blocking beam describes, for example, a stud, an attachment, or a differently designed, mechanical protrusion of the respective blocking beam, wherein the extension is associated with a side facing away from the remaining blocking beam, and in particular is located on an opposite side with respect to the blocking beam swivel axis, relative to the blocking beam, so that a leverage ratio results between the extension and the blocking beam, about the blocking beam swivel axis, and thus a movement of the extension in one direction triggers a rotation of the blocking beam about the blocking beam swivel axis, wherein the blocking beam is moved in the other direction in each case. The stud, the attachment, or the differently designed, mechanical protrusion can in this case comprise additional elements, for example, for reducing friction and/or for reducing play, for example, rollers, springs, or also spring-loaded rollers, and/or combinations thereof, for example, also having a corresponding roller guide.

In an embodiment of the present invention, the blocking beam comprises a first blocking beam portion and a second blocking beam portion, wherein the first blocking beam portion is received in the blocking beam receiving portion and the second blocking beam portion is designed to be offset relative to the first blocking beam portion, along a blocking beam longitudinal axis.

An offset blocking beam of this kind allows for a further geometrical adjustment of the movements of the device so that, for example, a blocking beam that is received rotatably about the blocking beam rotational axis can be equipped with an additional offset, and thus via a rotational movement of the blocking beam about the blocking beam rotational axis, i.e., the rotational additional movement about the blocking beam rotational axis, a correspondingly delayed pivoting into the separating region and/or an accelerated pivoting out of the separating region can additionally be configured, specifically via the geometry of the respective blocking beam itself.

The present invention further provides a person separating device comprising a main body, a passage, and a device according to any of the embodiments described above, wherein the holding apparatus is installed on the main body so that, in the event of a rotation of the rotational receiving portion in the rotational plane about the rotational axis, one of the blocking beams is pivoted out of the passage and another of the blocking beams is pivoted into the passage, so that a separating region is formed in the passage. A person separating device of this kind makes use of all the advantages of a device for separating persons, for example, in that a complete person separating device is formed in the sense of a gate system and/or passage system.

A "person separating device" in this case describes an entire system for separating persons which can, for example, comprise additional components or additional functional components. A person separating device of this kind can thus comprise corresponding lateral limitations, for example, walls, or also corresponding other components of a gate system or also of a fence system. A person separating device of this kind is, for example, a turnstile system, in order to regulate and limit the access to business premises.

A "main body" is in this case, for example, a pillar, a wall, or also a system part, at which the holding apparatus can be fastened in a fixed manner, specifically in a stationary manner.

A "passage" describes the region in which the separation of persons is intended to be performed in which, specifically, the separating region is arranged.

The arrangement of the holding apparatus on the main body is in this case selected so that corresponding blocking beams interact with the passage so that the separating region is arranged and formed in the passage, wherein, for example, the respective blocking beams pivot into the passage or pivot out of the passage depending on the rotation of the rotational receiving portion in the rotational plane about the rotational axis.

In an embodiment of the present invention, the rotational plane is arranged at an angle relative to a vertical plane, in particular at an angle of 20° to 70°, at an angle of 30° to 60°, or at an angle of 45° relative to the vertical, wherein the holding apparatus is in particular arranged on a fastening plane, on the main body, that is inclined relative to the vertical plane, according to the angle.

An "angle" in this case describes the angular relationship between the rotational plane and a vertical plane, for example, a vertical wall surface or a vertical, imaginary reference plane, which extends in parallel with a gravitational axis.

In order to functionally design the person separating device, the rotational receiving portion is assigned an in particular electrical drive, wherein the in particular electrical drive is controllable in particular via a control device for driving and/or for blocking the rotational receiving portion about the rotational axis.

The rotational receiving portion can thus be actively actuated and driven via the drive so that it is possible to carry out, for example, a locking or a blocking of the rotational receiving portion in the case of denied access for a person to be separated, or also the rotational receiving portion can be driven if a person is, for example, to be conducted through the separating region without resistance or with reduced resistance of a blocking beam.

What is known as an emergency function or also evacuation function can in this case also be made possible via the control device, wherein, for example, the control device actuates the drive so that, in the case of an emergency that triggers such an emergency function, or an evacuation situation triggering an evacuation function, a free passage through the separating region is made possible, for example, in that the rotational receiving portion remains freely rotatable or is freely rotatable. A corresponding blocking beam can likewise be unlocked via an actuator, for example, by releasing its swivel axis and/or a further degree of freedom.

A "drive" describes an active mechanical engagement in the rotational receiving portion wherein a forced movement is, for example, imparted to the rotational receiving portion so that a defined rotation behavior of the rotational receiving portion can be brought about via the drive. A drive of this kind is in particular designed electrically, for example, as an electric motor or also as a brushless electric motor. A drive of this kind can additionally comprise a transmission so that a rotational speed or a torque of the drive is or are decreased or increased.

A "control device" is, for example, a motor controller, a computer, or also a programmable logic controller, wherein the control device can receive and process electrical and/or electronic signals and convert them, for example, according to an instruction previously stored in the control device, in particular a software, and output them in signals for the drive.

"Driving" of the rotational receiving portion describes, for example, an active acceleration of the rotational receiving portion so that an increased movement of the rotational receiving portion takes place via the driving. In contrast, "blocking" of the rotational receiving portion about the rotational axis describes a reduction of a corresponding rotation, up to complete locking, i.e., a state of the rotational receiving portion in which no more rotational movement, in particular no more rotation, is made possible. Such "blocking" takes place, for example, if a person, when passing through the person separating device, should be refused access to a region monitored by the person separating device.

In an embodiment of the present invention, one blocking beam, a plurality of blocking beams, or all the blocking beams comprises/comprise a display device for displaying a passage state. A display device of this kind can thus comprise an illumination device, a light guide device such as optical fibers or prisms, or also a reflection device such as reflectors, via which a light signal can be issued to a user. In the case of the reflection device or also the light guide device, the light source required therefor be arranged outside the blocking beams, for example, in a pillar. Each blocking beam can, for example, be provided with an LED strip which can provide illumination in different colors. A green illumination can thus, for example, indicate a free or released passage, a yellow illumination can, for example, indicate waiting for a release, while a red illumination can, fore example, indicate a blocked passage, for example, in the case of refused identification. Corresponding light can likewise be directed to the blocking beams via reflectors, and directed and displayed to a user via optical fibers and/or also via prisms.

In a further embodiment of the present invention, the rotational receiving portion and/or a blocking beam, a plurality of blocking beams or all blocking beams is/are designed to be height-adjustable via a height-adjustment device so that a height of the blocking beams, for example, above a ground or above a reference plane, can be set. A height-adjustment device can, for example, be designed in a simple form as a telescopic device for the rotational receiving portion which acts in the height direction. The telescopic device can in this case, for example, be formed in a height-adjustable pillar.

The present invention will be explained in greater detail in the following, with reference to embodiments as shown the drawings.

A turnstile system 101 is constructed on the ground 103 close to a wall 105. The turnstile system 101 comprises a pillar 107 which defines a passage 109 formed between the pillar 107 and the wall 105. The pillar 107 comprises an installation surface 121 which is arranged to be inclined by the angle 123 relative to the vertical. In the example shown, the angle 123 is an angle of 45°. The installation surface 121 is in this case inclined so that an upper region of the installation surface 121 is closer to the wall 105 than a lower region, i.e., the installation surface 121 is designed as an undercut in the pillar 107. For variably adjusting the height of a turnstile 111 in the passage 109, the pillar 107 can be designed to be height-adjustable, for example, telescopic.

The turnstile 111 is received on an installation surface 121 in a stationary manner. A base plate 301 of the turnstile 111 is firmly screwed to the installation surface 121 therefor. A hub 501 is received in a rotatable manner on the base plate 301, wherein the hub 501 carries a plurality of blocking beams 203. In the example shown, three blocking beams 203 are arranged so as to be distributed uniformly around a periphery of the hub 501, and specifically so that a blocking beam 203 is arranged in the passage 109 and, upon a rotation of the hub 501 relative to the base plate 301, a further blocking beam 203 is pivoted into the passage 109, and the blocking beam 203 previously located in the passage 109 is pivoted out of the passage 109. Via a rotation of the turnstile 111, a person separation can thus be performed in the passage 109 via the blocking beams 203.

Each blocking beam 203 has a round cross-section 281 and is provided with a blocking portion 204 and an offset 205, and a stud 206 that is arranged on the portion of the blocking beam 203 opposite the blocking portion 204. The cross-section of the blocking beams 203 is cited here by way of example, but oval, rectangular, or differently shaped cross-sections can likewise also be selected, according to technical and/or aesthetic considerations. The blocking beams can also be exchangeable. A longitudinal axis 211 of the blocking beam 203 extends along the blocking beam and is provided with a direction change at an inflexion point 207 and has an offset about the inflexion point 207 of approximately 45°. The longitudinal axis 211 thus extends completely along a longitudinal axis of the blocking beam 203, and specifically in each case in parallel with the blocking portion 204 and the stud 206. A groove 209 is furthermore made on the stud 206, which groove 209 serves for the non-rotatable installation of the blocking beam 203. The blocking beam 203 is received, together with the stud 206, in the direction of the hub 501.

For this purpose, in the example here described, each blocking beam is provided with an LED strip (not shown) which can provide illumination in different colors. An LED strip of this kind can in this case be optional, i.e., present only in certain alternatives. For example, a green illumination thus indicates a free or released passage through the turnstile system 101, a yellow illumination indicates, for example, waiting for a release, while a red illumination indicates, for example, a blocked passage, for example, in the case of a rejected identification. Corresponding light can also be directed to the blocking beams via reflectors, and directed and displayed to a user via optical fibers and/or also via prisms.

The base plate 301 comprises a flange 305 on a rear side 303, wherein the flange 305 protrudes relative to the flat rear side 303 and is arranged concentrically to the round base plate 301. Fastening holes 307 are arranged in the flange 305, via which holes 307 the base plate 301 is screwed to the pillar 107, specifically via screws that are pushed through (not shown). In an alternative, a welded connection or another connection can also here be selected. A guide hole 309 is also arranged concentrically in the base plate 301, which guide hole 309 serves to receive the hub 501.

Figure 3:
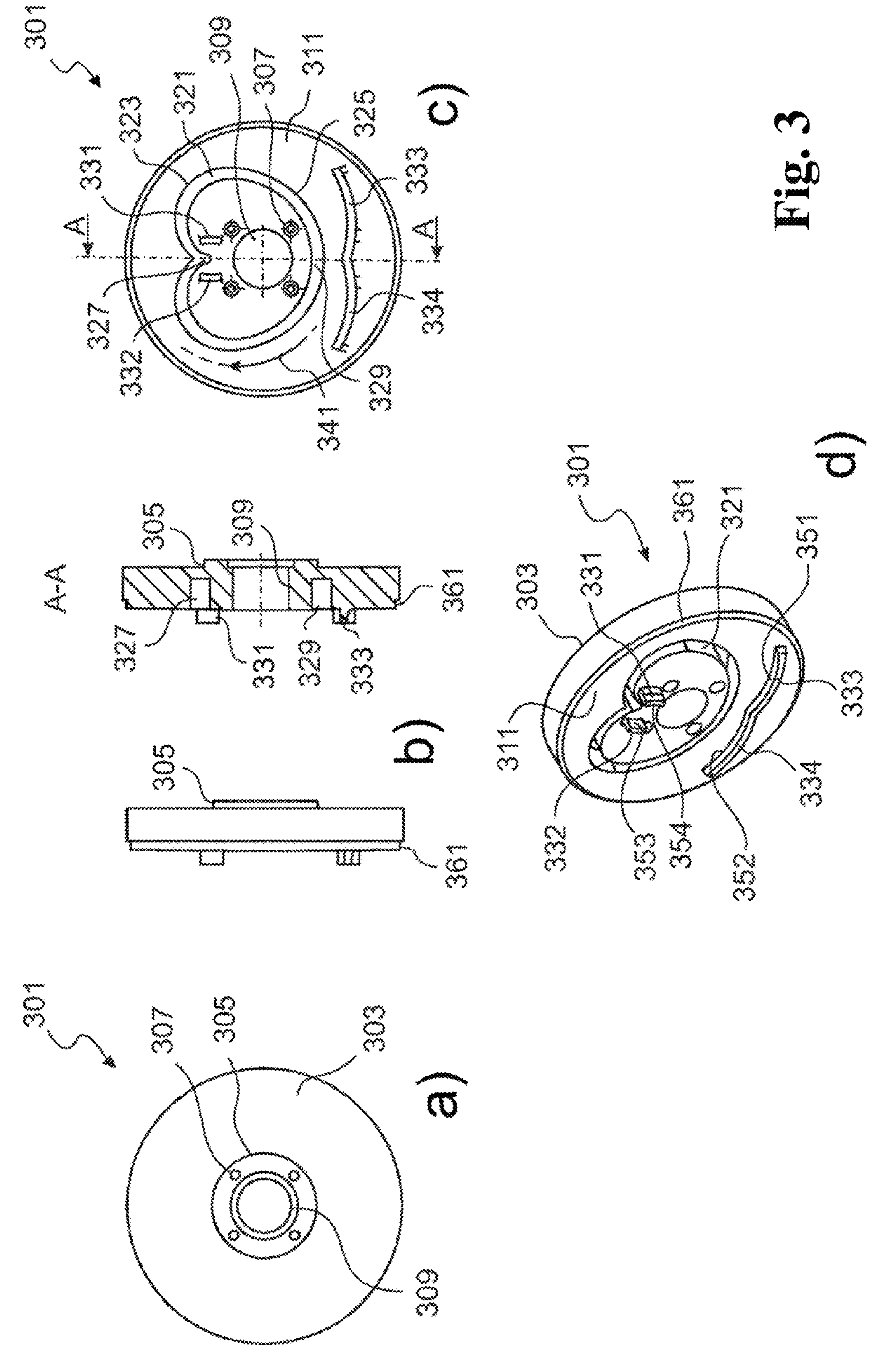
FIG. 3*a*) is a rear view of the base plate of the functional unit.
FIG. 3*b*) is a side view and a sectional side view of the base plate.
FIG. 3*c*) is a front view of the base plate together with a control guide.
FIG. 3*d*) is an isometric view of the base plate.
Figure 4:
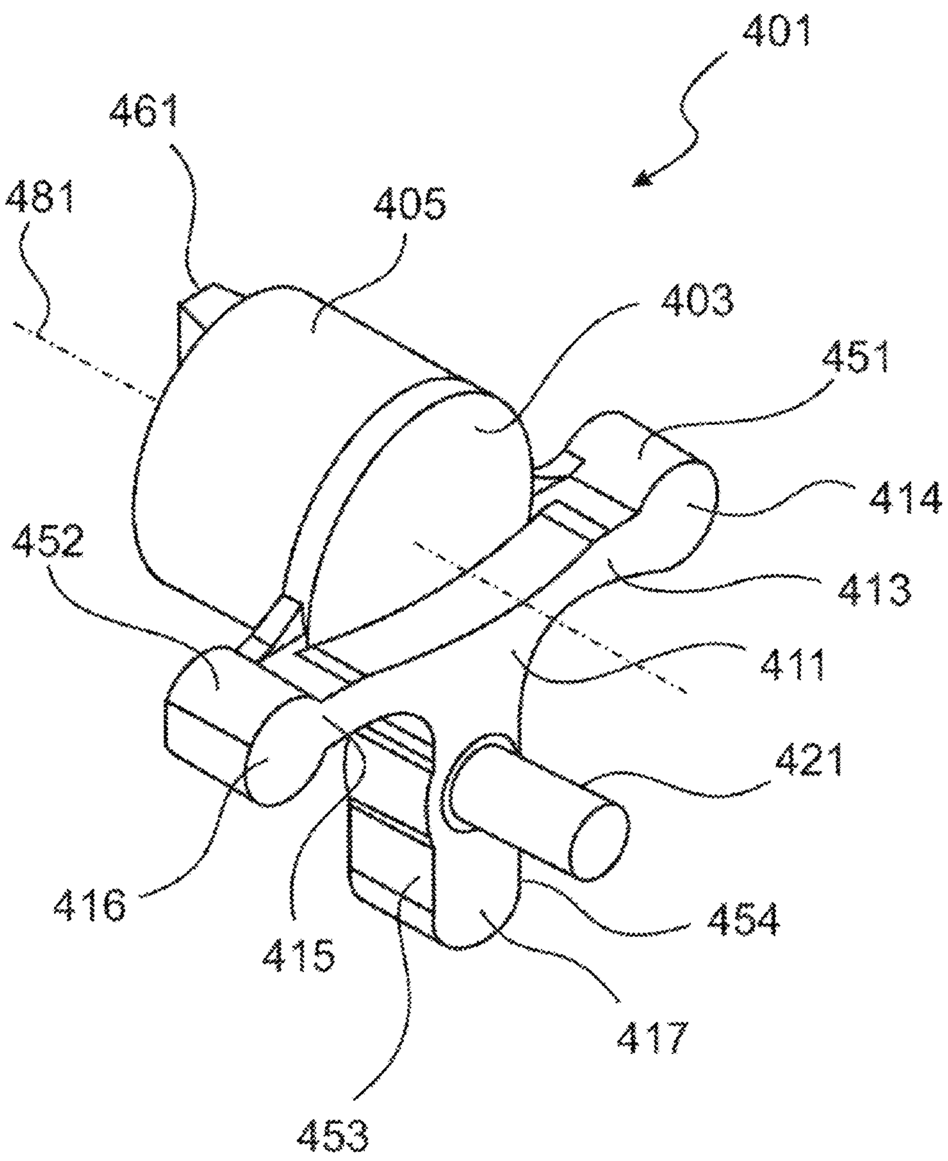
FIG. 4 is an isometric view of a coupling piece for coupling a blocking beam to the control guide of the base plate.
Figure 5:
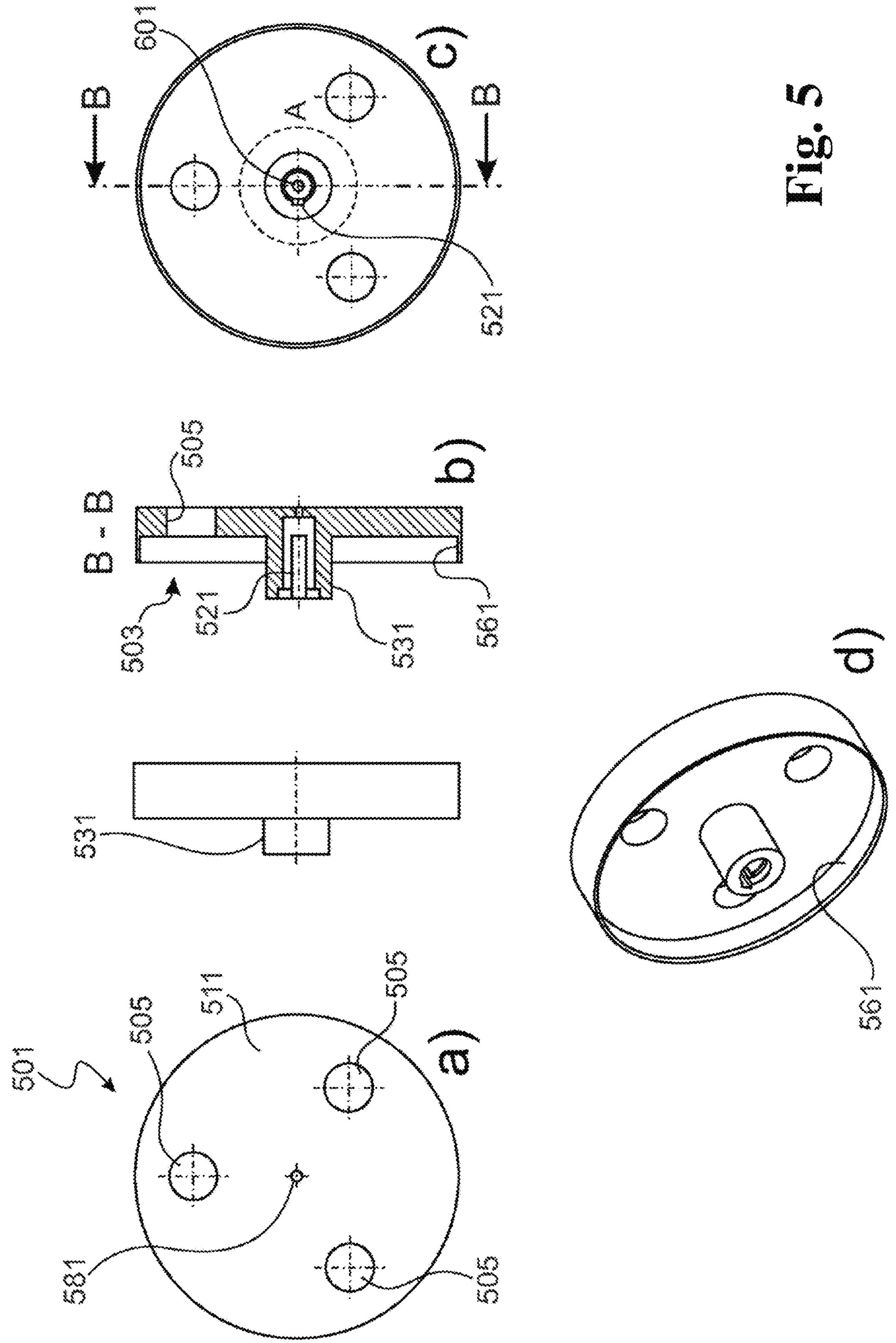
FIG. 5*a*) is a front view of a hub of the turnstile.
FIG. 5*b*) is a side view and a sectional side view of the hub.
FIG. 5*c*) is a rear view of the hub.
FIG. 5*d*) is an isometric view of the hub.

On a front side 311, which is opposite the rear side 303, the base plate 301 is designed geometrically for controlling the functions of the turnstile 111. For this purpose, the base plate 301 comprises a control groove 321 which is designed to be approximately heart-shaped, symmetrically to a central axis (along section A-A in FIG. 3*c*). The control groove 321 in this case has a significantly curved region 323, a slightly curved region 325, and a tilting zone 327, wherein the control groove 321 has a point of singularity, specifically a jump in the (mathematical) differentiability, in the tilting zone, wherein the control groove 321 undergoes a direction change of approximately 90°. The control groove 321 is engraved in the front side 311 of the base plate 301, specifically as a milled control groove. The control groove 321 also comprises a flat region 329 which is arranged along a course 341 of the control groove 321 opposite the tilting zone 327. The flat region 329 has virtually no curvature, i.e., is curved only to a very small extent compared with the significantly curved region 323 or the slightly curved region 325.

An auxiliary guide 331 and an auxiliary guide 332 arranged symmetrically relative to the central axis are also arranged on the front side 311, specifically protruding relative to the front side 311, which auxiliary guides 331, 332 are arranged in the vicinity of the tilting zone 327. An auxiliary guide 333 and an auxiliary guide 334 are arranged along the flat region 329, which auxiliary guides 333, 334 are also designed as guides that protrude relative to the front side 311. Facing the control groove 321 in each case, the auxiliary guides comprise corresponding guide surfaces, specifically the auxiliary guide 331 comprises a guide surface 354, the auxiliary guide 332 a guide surface 353, the auxiliary guide 333 a guide surface 351, and the auxiliary guide 334 a guide surface 352. In this case, these guide surfaces are arranged approximately perpendicularly to the front side 311, i.e., in the direction of the protrusion of the respective auxiliary guide. A rebate 361 is also formed on the round base plate 301, peripherally around the front side 311.

A coupling piece 401 comprises a main body 403 on which a stud 405 is set. The stud 405 comprises a rib 461 on an end face, which rib 461 is designed to correspond to the groove 209 in the respective blocking beam 203. As a result, the blocking beam 203 can be fastened on the stud 405 of the coupling piece 401, for example, via spot-welding or axial screwing. For this purpose, the respective stud 206 of the respective blocking beam 203 is set on the stud 405, specifically along a rotational axis 481.

The coupling piece 401 further comprises a cross fitting 411, which comprises an arm 413 having a head 414, an arm 415 having a head 416, and an arm 417. The arm 413 is in this case arranged opposite the arm 415, and the arm 417 is in this case arranged orthogonally to the arm 413 and the arm 415. The head 414 comprises a contact surface 451, and the head 416 comprises a contact surface 452. The arm 417 comprises a contact surface 453 and an opposite contact surface 454, wherein the respective contact surfaces are in each case arranged laterally on the relevant arms. The arm 417 furthermore carries a pin 421 which is introduced into the arm 417 in parallel with the rotational axis 481.

The hub 501 is also designed to be round and comprises a collar 561 on a rear side 503, which collar 561 is designed geometrically so that the collar 561 engages over the rebate 361 of the base plate 301 and thus provides a soft transition between the hub 501 and the base plate 301 without a gap remaining.

A shaft journal 531 is also arranged concentrically on the rear side 503, which shaft journal 531 engages in the guide hole 309 of the base plate 301 and is rotatably guided in the guide hole 309, wherein a fit is here selected that allows for a rotation of the hub 501 and reduces the tilting play of the hub 501 relative to the base plate 301 to a necessary minimum.

A hole having a feather key 521 is made inside the shaft journal 531 so that, via the feather key, a torque from a drive (not shown) can be transmitted to the hub 501, and the hub 501 thus takes place relative to the base plate 301 that is rigidly connected to the pillar 107.

The hub 501 also comprises three receiving holes 505 which are arranged symmetrically about a rotational axis 581 and correspond to the diameter of the stud 405 of the coupling piece 401. A respective blocking beam 203 can thus be received in the hub 501 so as to be rotatable about the rotational axis 481 via the stud 405 of the coupling piece 401.

Figure 6:
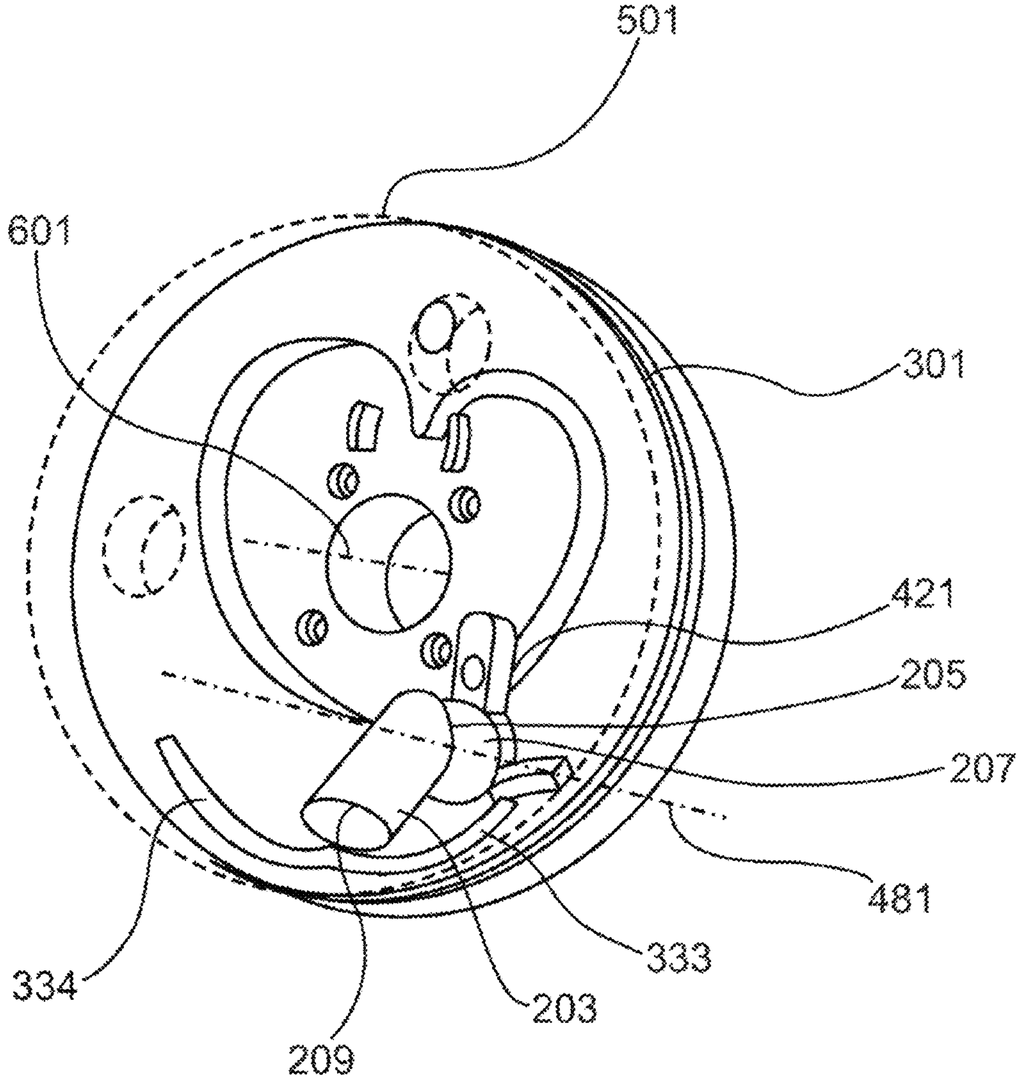
FIG. 6 is an isometric view of an assembly of the base plate, the hub, one of the coupling pieces, and one of the blocking beams, for illustrating the functional relationships.
Figure 7:
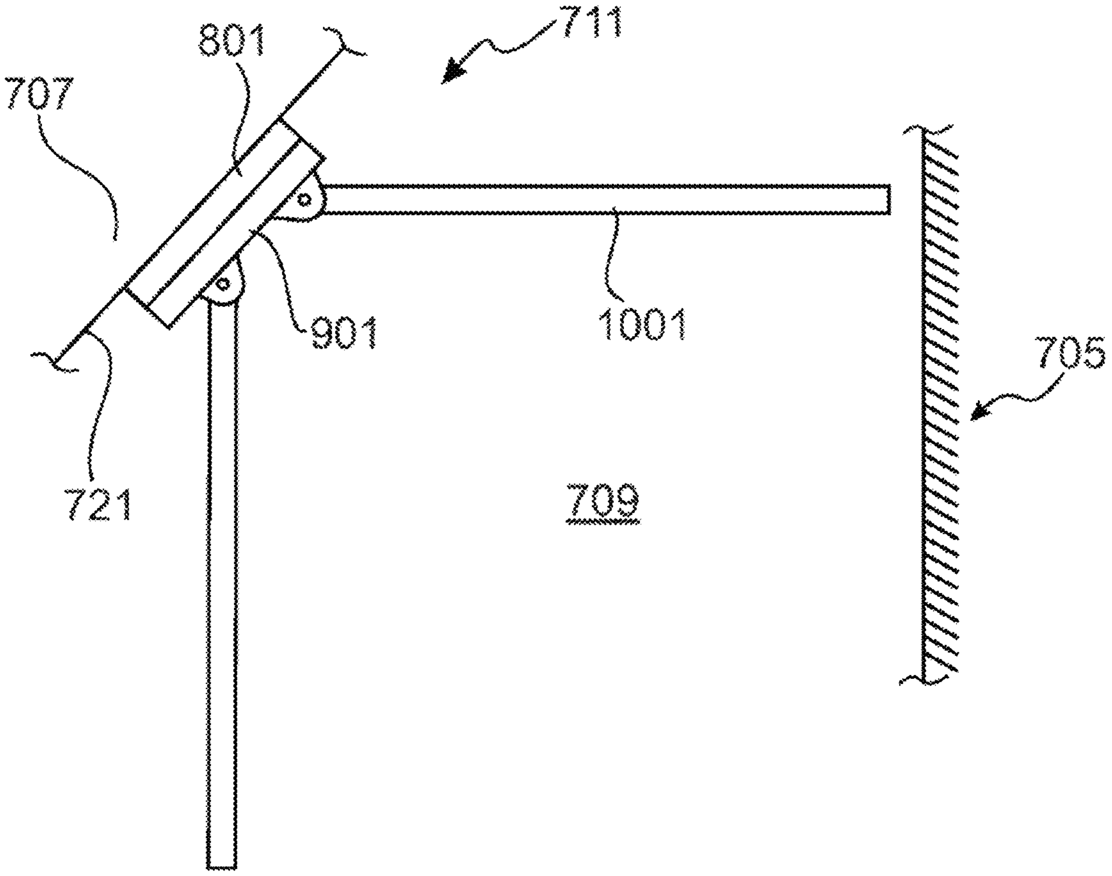
FIG. 7 is a schematic front view of an alternative turnstile system comprising a turnstile.
Figure 8:
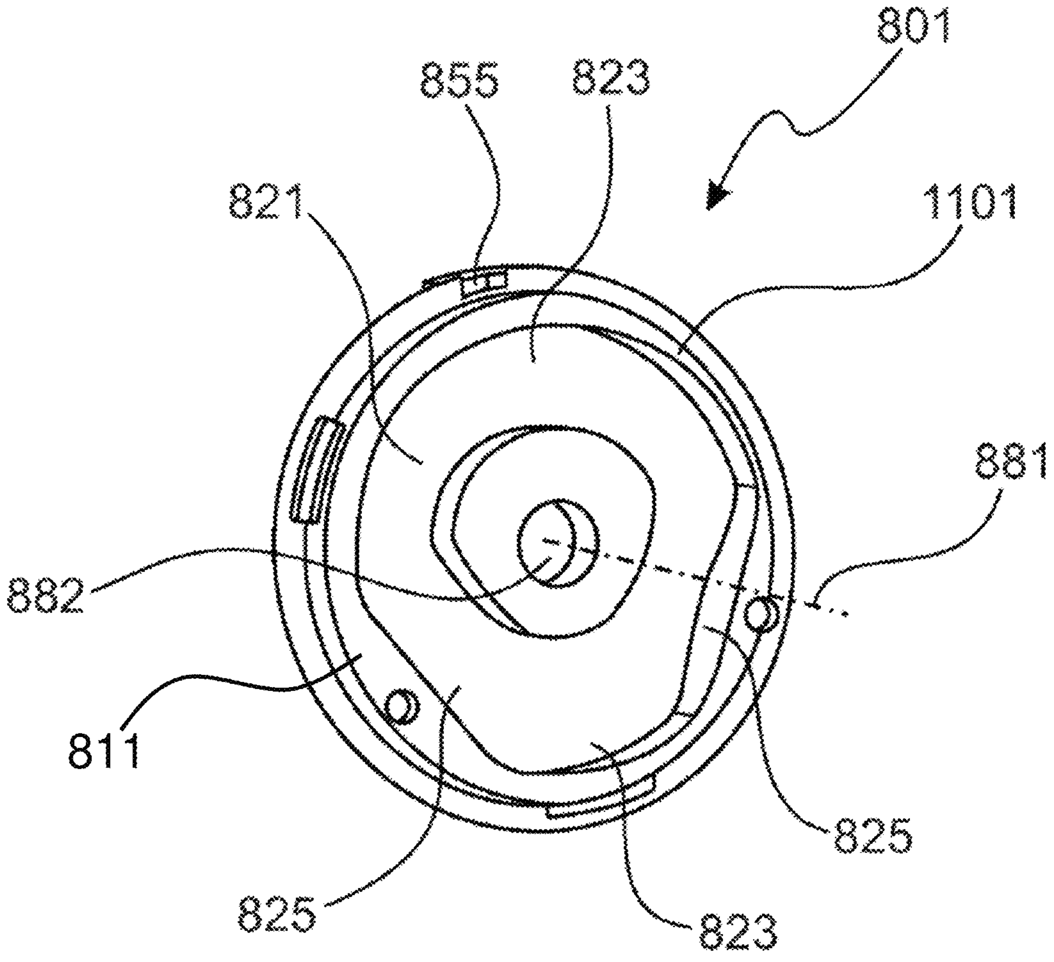
FIG. 8 shows a base plate of the turnstile of FIG. 7.
Figure 9:
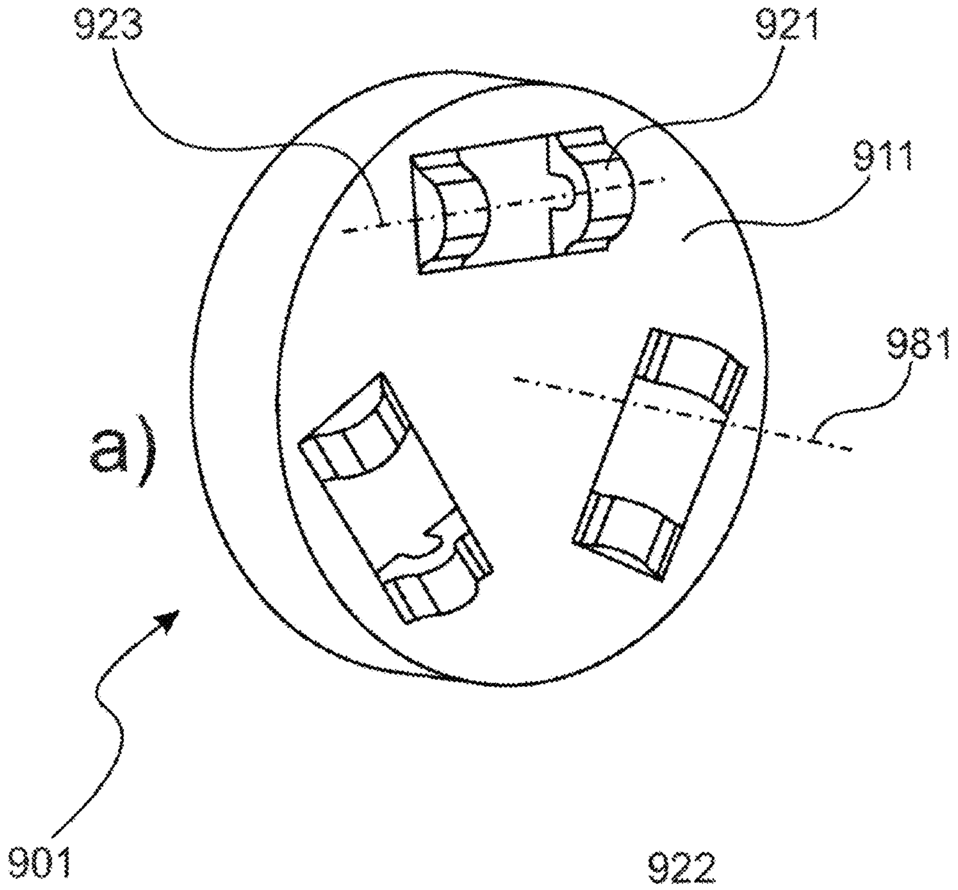
FIG. 9*a* is an isometric front view of a hub of the turnstile of FIG. 7.
FIG. 9*b* is an isometric rear view of the hub of FIG. 9*a;*
Figure 9:
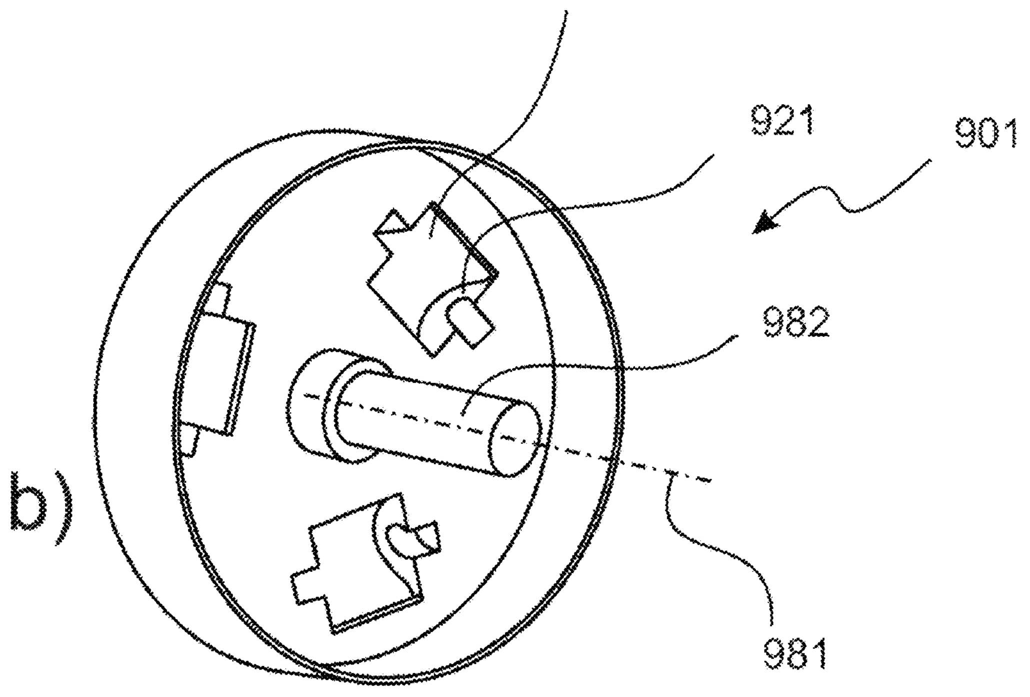
Figure 10:
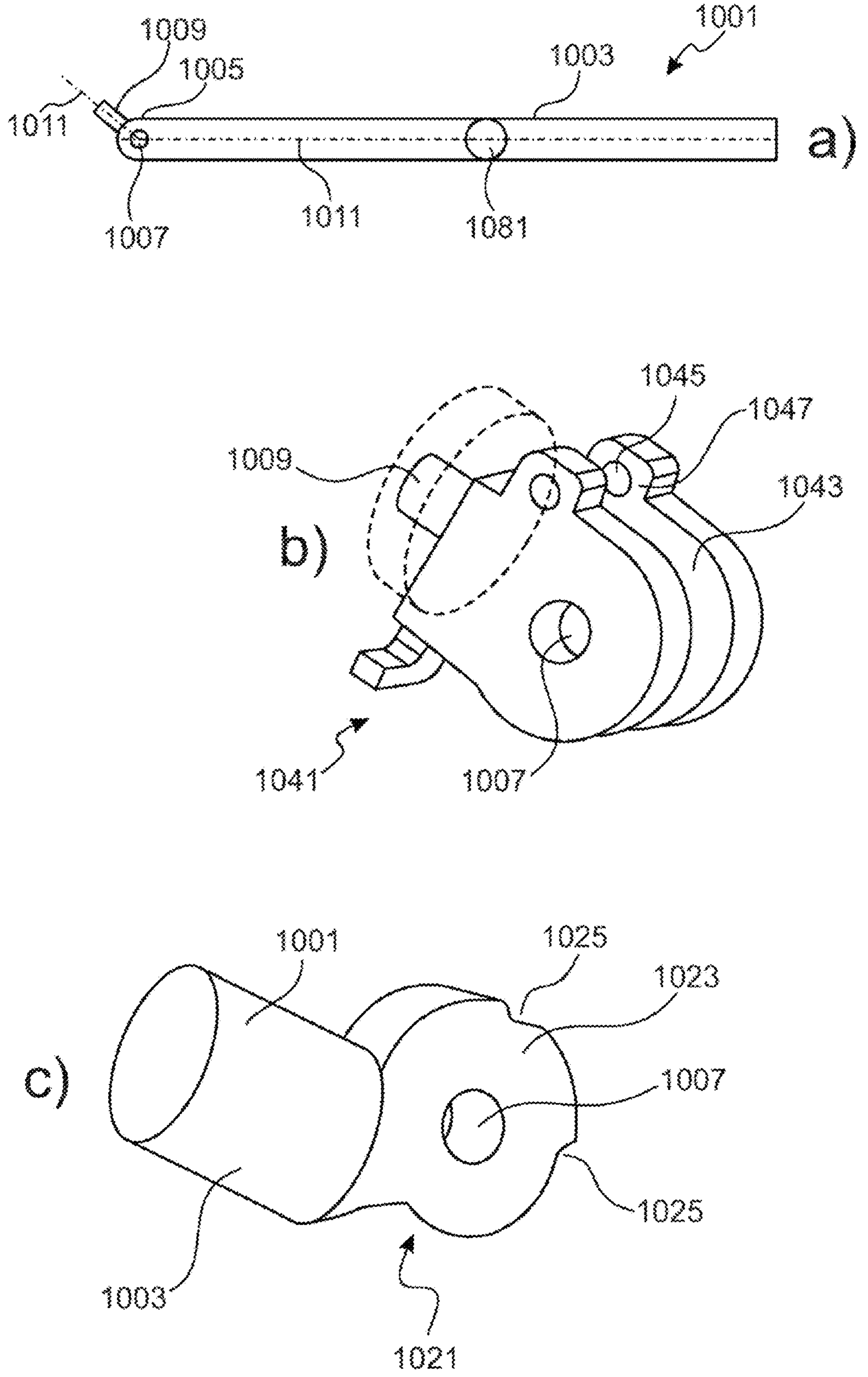
FIG. 10*a* is a side view of a blocking beam of the turnstile of FIG. 7.
FIG. 10*b* is an isometric detail view of a receiving piece of the blocking beam of FIG. 10*a;*
FIG. 10*c* is an isometric detail view of a connecting piece of the blocking beam of FIG. 10*a;*
Figure 11:
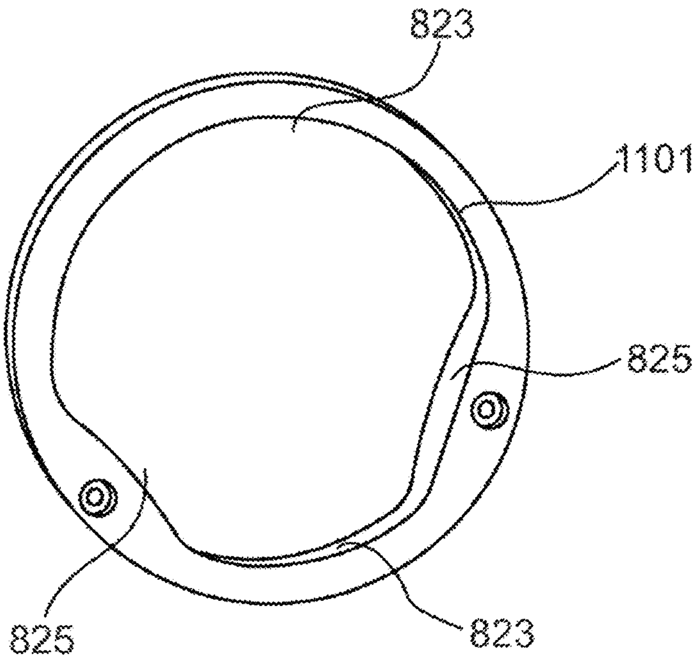
FIG. 11 is an isometric view of a control ring for the base plate of FIG. 8.
Figure 12:
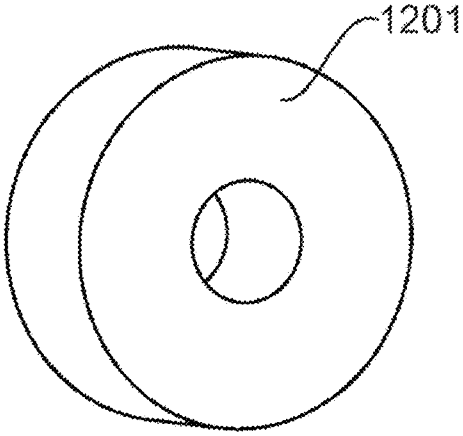
FIG. 12 is an isometric view of a roller for a stud of the receiving piece of FIG. 10*b;*
Figure 13:
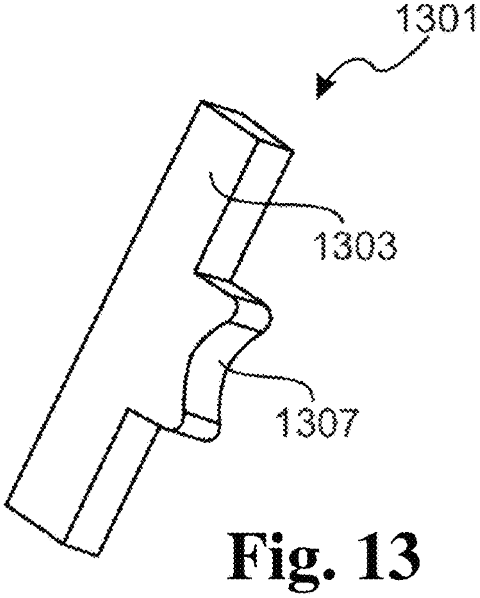
FIG. 13 is an isometric view of a bearing block for the connection of the blocking beam of FIG. 10*a* to the hub of FIG. 9.
Figure 14:
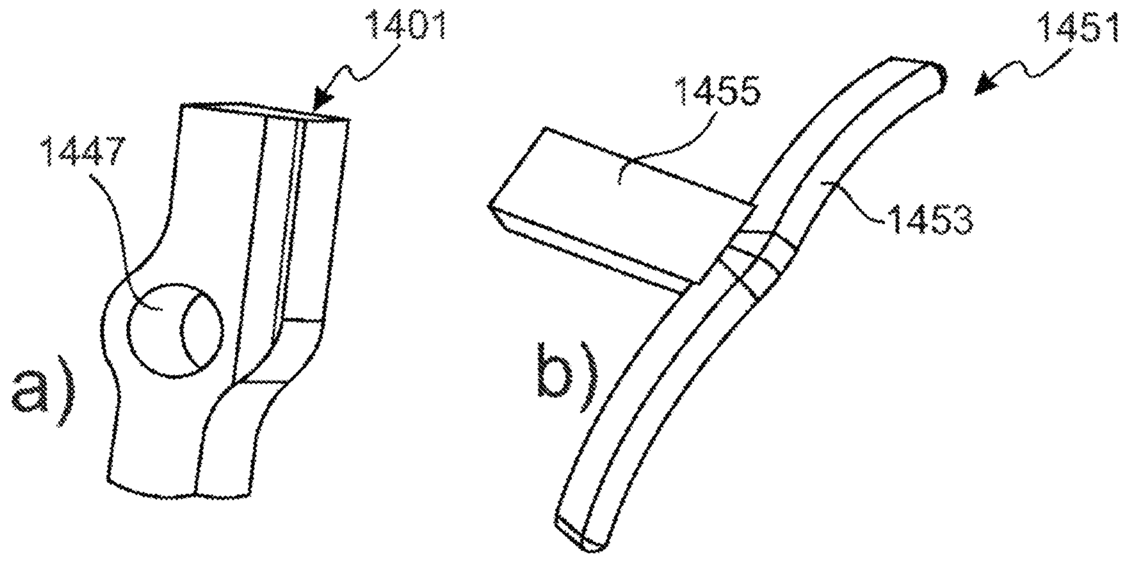
FIG. 14*a* is an isometric view of a lever for emergency unlocking of the turnstile system of FIG. 7.
FIG. 14*b* is an isometric view of a guide bracket for the emergency unlocking of the turnstile system of FIG. 7.

In a fully installed state (see FIG. 6), the base plate 301 is firmly screwed to the pillar 107, three blocking beams 203 are received via the respective coupling pieces 401 (each shown singly in FIG. 6), wherein each coupling piece 401 is received in the corresponding receiving hole 505 of the hub 501 and thus each blocking beam 203 is rotatable, relative to the hub 501, about the rotational axis 481.

The hub 501 is inserted into the guide hole 309 of the base plate 301, together with the shaft journal 531, as a terminating cover, and, for example, secured relative to the base plate 301 via a central screw connection (not shown). The respective pin 421 of the coupling piece 401 is received in the control groove 321 of the base plate 301 so that the pin 421 is guided by the control groove when the hub 501 is rotated relative to the base plate 301 via the drive. The assembly is held together by a screw 601 (whereby only the screw axis is shown).

If the hub 501 is now rotated relative to the base plate 301, then an additional movement relative to the hub 501 is imparted to the respective blocking beam 203 via the coupling piece 401 and the guidance of the pin 421 in the control groove 321, wherein the additional movement depends on the geometric design of the control groove 321. In this case, in the present example, a blocking beam 203 arranged in the passage 109 is held exactly horizontally and protrudes significantly relative to the hub 501 in the direction of the wall 105. In this state, the pin 421 of the relevant blocking beam 203 is located in the tilting zone 327 of the control groove 321. In order that the coupling piece 401 does not jam at this point, the coupling piece is guided via the contact surfaces 453 and 454, and specifically so that the contact surface 453 rests on the guide surface 354, and the contact surface 454 rests on the guide surface 353, and thus the coupling piece cannot jam.

In the case of a further rotation of the hub 501, the pin 421 is then initially held in the tilting zone 327 and the blocking beam 203 experiences an accelerated additional movement in addition to the rotational movement of the hub 501 so that the blocking beam 203 pivots out of the passage 109 in an accelerated manner. In the further course, the pin is then guided through the significantly curved region 323 into the slightly curved region 325, as a result of which the accelerated movement is slowly transferred in the direction of a uniform movement to the rotational movement of the hub 501. If the pin 421 then dips into the slightly curved region 325 and is transferred into the flat region 329, there is then a risk of tilting of the coupling piece 401 relative to the base plate 301, wherein the coupling piece 401 is guided via the arms 413 and 415 and the contact surfaces 451 and 452, located thereon, on the guide surfaces 351 and 352, so that no wobbling of the coupling piece 401 is possible. In this region, the blocking beam 203 is guided as far as possible vertically or is guided substantially vertically, so that the blocking beam 203 that is now hanging downwards is removed from the passage 109 for as long a time as possible. If it is then transferred relative to the region, as just described, of the control groove 321, then an inverse process is performed and the coupling piece experiences an additional movement via the pin 421, which allows for a delayed pivoting of the blocking beam 203 into the passage 109. The passage 109 is thus passable for a person for as long as possible, and nonetheless a reliable person separation via the blocking beam 203, which is positioned horizontally in the passage 109, is possible.

In an alternative embodiment of the present invention, the turnstile system 701 comprises a turnstile 711, which is fastened to a pillar 707 (which is shown only in part) and defines a passage 709 relative to a wall 705. The fundamental design of the turnstile system 701 is designed analogously to the turnstile system 101, and therefore only the different parts are here described. For this purpose, the turnstile system is equipped with the turnstile 711, which is installed in a stationary manner on an installation surface 721 of the pillar 707. The pillar 707 can also be designed to be height-adjustable, for example, telescopic.

A base plate 801 is firmly screwed to the installation surface 721. On a front side 811, the base plate 801 comprises a control groove 821, which is designed in a manner engraved in the overall shape of the base plate 801. The control groove 821 in this case is designed to have round portions in the peripheral direction and so as to be in part flattened in the peripheral direction. For this purpose, the control groove 821 comprises respective regions 823 and respective regions 825, wherein the regions 823 are round and the regions 825 are flattened relative to the round regions. In this case, the shape of the control groove 821 follows a mathematical function, which provides a smooth transition, i.e., is continuous and in particular also differentiable in the corresponding regions. In this case, this function can, for example, comprise sinusoidal portions, parabolic portions, or higher-order portions. The control groove is formed via a control ring 1101 placed on the base plate 801 but can alternatively also be designed as an integral component of the base plate 801, for example, by milling.

A hub 901 which is arranged on the base plate 801 and is designed, analogously to the hub 501 of the previous example, to be rotatable relative to the base plate 801, comprises joint plates 921 on a front side 911, which joint plates 921 are arranged tangentially to a rotational axis 981. Two joint plates 921 serve in each case to form a pivot axis 923, wherein one of three blocking beams 1001 is received on each pivot axis 923 via respective joint plates 921. The hub 901 further comprises a centrally and concentrically arranged, protruding stud 982, via which the hub 901 is guided, in an installed state, in a central hole 882 made concentrically in the base plate 801 so as to be rotatable about a rotational axis 881 which, in the installed state, is congruent with the rotational axis 981.

Each blocking beam 1001 comprises a blocking portion 1003 which can pivot into the passage 709, and furthermore an offset 1005 and a hole 1007, which serves as a pivot point for the respective blocking beam 1001. Opposite the blocking portion 1003, with respect to the hole 1007, each blocking beam 1001 comprises a coupling stud 1009 which, in a normal state, is arranged at an angle of approximately 45° relative to the blocking portion 1003. A longitudinal axis 1011 extends analogously to the longitudinal axis 211 of each blocking beam 1001 in an offset manner around the hole 1007, i.e., in each case in parallel with the blocking portion 1003 and with the coupling stud 1009. Each blocking beam 1001 has a likewise round cross-section 1081. Each blocking beam 1001 is in this case formed in two parts and comprises the blocking portion 1003 of the blocking beam 1001 having a connecting piece 1021, and a receiving piece 1041 corresponding thereto.

The connecting piece 1021 comprises a connection flange 1023 which can be inserted into a slot 1043 of the receiving piece 1041. The common hole 1007 is thus formed both in the connecting piece 1021 and in the receiving piece 1041 so that a bolt or a shaft (which is not shown) connects the two parts so as to be pivotable relative to one another about the hole 1007. In the installed state, the receiving piece 1041 is received in the region of apertures 922 in the hub 901 so that in the installed state the assembly of the blocking beams 1001 with the blocking portion 1003 is arranged at an angle of approximately 45° relative to the hub 901, and thus relative to the base plate 801.

A bearing block 1301 comprising a main body 1303 and an annular groove 1307 is arranged in each case on both sides of each hole 1007 of each receiving piece 1041 and stabilizes the bolt (which is not shown) located in the hole 1007, relative to the hub 901. Each bearing block 1301 is in this case screwed to the hub 901 in order to fix the respective bearing block 1301 (not shown).

In an installed state, the respective hole 1007 is arranged flush with the respective pivot axis 923 so that each blocking beam 1001 is received pivotably in the hub 901. In this case, in the installed state, each coupling stud 1009 is received in the control groove 821 via a roller 1201 that is plugged onto the coupling stud for reducing the friction in the control groove 821 so that in the case of a rotation of the hub 901 relative to the base plate 801, a respective additional movement is imparted to the blocking beams 1001 via the coupling stud 1009 that is guided in the control groove 821 via the roller 1201. Each roller 1201 is in this case additionally provided with a spring (not shown) in order to compensate play and prevent impact noises. A system consisting of a plurality of springs, or a plurality of springs, can alternatively or additionally be used therefor in parallel in order to achieve corresponding spring properties. Each blocking beam 1001 is in this case guided so way that, analogously to the previous example, in the case of a rotation of the hub 901, it pivots out of the passage 709 in an accelerated manner, and enters the passage 709 again with a delay, so that a comfortable person separation is made possible.

The function of a blocking beam 1001 in conjunction with the connecting piece 1021 and the connection flange 1023 is explained in detail as follows:

As described, the connecting piece 1021 is received, with its connection flange 1023, in a slot 1043 in the receiving piece 1041, and is arranged to be pivotable about the common hole 1007. A lever 1401 is also arranged in the receiving piece 1041 in a receiving portion 1045 to be pivotable about a hole 1047 so that a hole 1447 of the lever 1401 is flush with the hole 1047 in the receiving piece 1041. The lever 1401 is as a result pivotable about the hole 1047 of the receiving portion 1045. For this purpose, a bolt (not shown) is inserted into the hole 1047 and into the hole 1447. The lever 1401 engages in a groove 1025 of the respective connection flange 1023 and, when the lever 1401 is in engagement with the groove 1025, hinders the connection flange 1023, and thus the connecting piece 1021, with respect to a pivot movement relative to the receiving piece 1041. This is the case in the normal operating state of the turnstile system 701 in that an angle of approximately 45° is set between each blocking portion 1003 of the blocking beam 1001 and the base plate 801 and also the hub 901. The turnstile system 701 in this state acts expediently and serves to separate persons via the individual blocking beams 1001.

A stud 1455 of a guide bracket 1451 is received in an aperture 855 on the base plate 801, which is arranged to be axially in parallel with the central hole 882 and thus in parallel with the rotational axis 881. The guide bracket 1451 furthermore comprises a slide rail 1453 which extends approximately in parallel with an end face of the base plate 801 and is designed to be wave-shaped. This wave shape effectively prevents a wedging or a jamming so that in particular in the event of a technical failure, a continued rotation of the system, and in particular also an emergency unlocking, is nonetheless possible. In the case of a rotation of the hub 901 relative to the base plate 801, the lever 1401 of each blocking beam 1001 slides on the slide rail 1453 so that the slide rail 1453 represents a control cam for the lever 1401. At correspondingly protruding regions of the slide rails 1453, the lever 1401 is pivoted about the hole 1447, and thus brought out of engagement with a respective groove 1025 on the connection flange 1023. The respective blocking beam 1001, in particular the respective blocking portion 1003, is then pivotable out of the passage 709 of the turnstile system 701 via a pivoting of the blocking beam 1001 about the hole 1007. As a result, overall, what is known as emergency unlocking can be performed by a forward displacement of the guide bracket 1451 relative to the base plate 801, i.e., the turnstile system 701 can be made inoperational, for example, for an evacuation situation.

Figure 15:
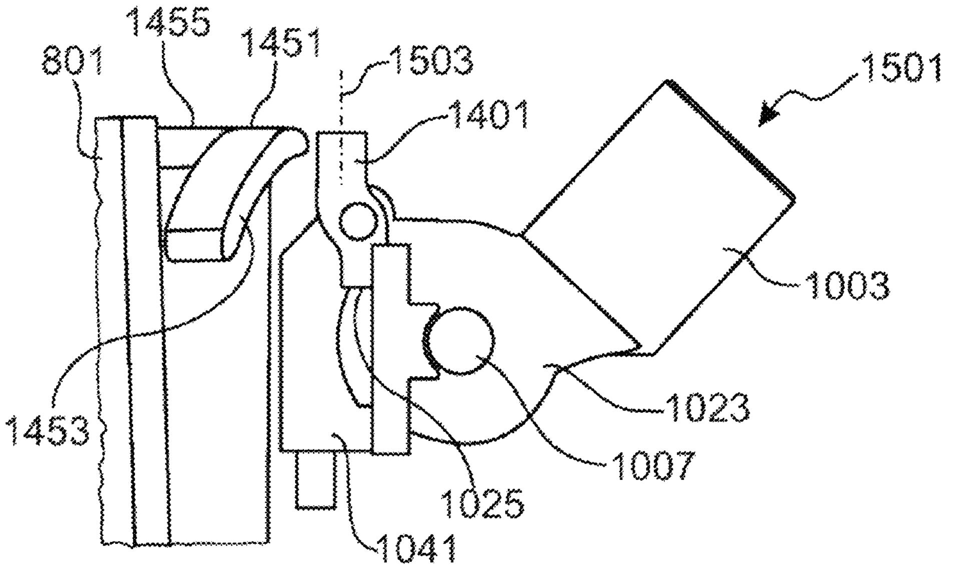
FIG. 15 is an isometric, partially transparent sectional view of a normal state of the turnstile system of FIG. 7.
Figure 16:
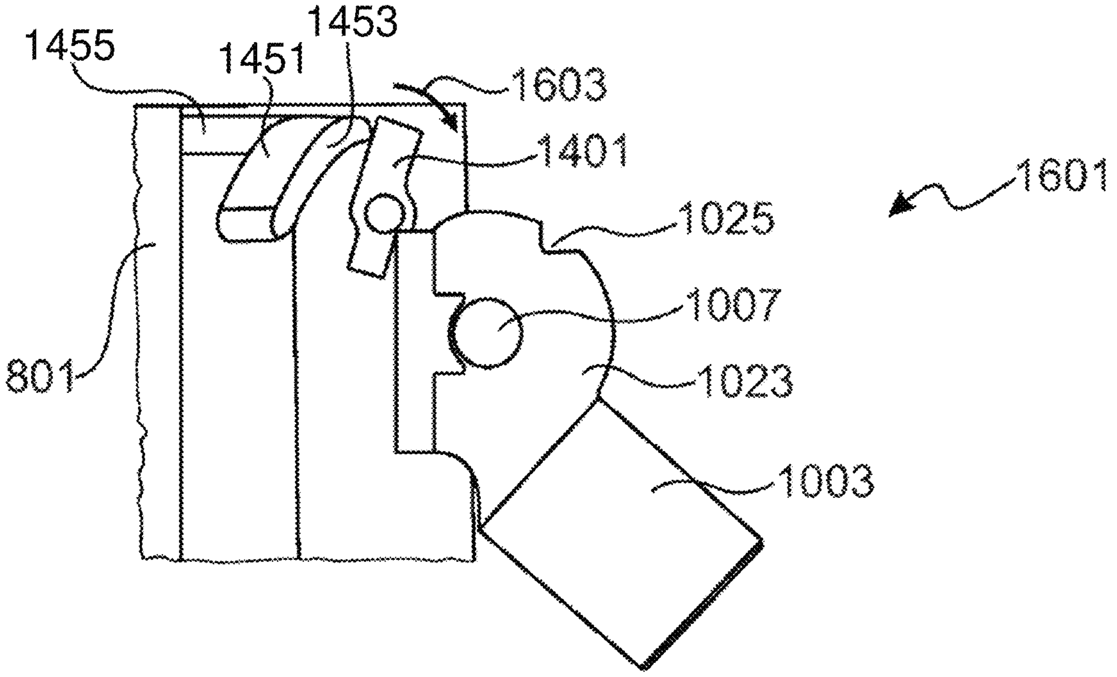
FIG. 16 is an isometric, partially transparent sectional view of an emergency unlocking state of the turnstile system of FIG. 7.

A normal state 1501 having a lever 1401 arranged along a vertical 1503 and in engagement with the groove 1025 (see FIG. 15), and an emergency unlocking state 1601 having a lever 1401 rotated about a rotational angle 1603 (see FIG. 16), again illustrate the two different states of the turnstile system 701.

The present invention is not limited to embodiments described herein; reference should be had to the appended claims.

LIST OF REFERENCE NUMERALS

101 turnstile system
103 ground
105 wall
107 pillar
109 passage
111 turnstile
121 installation surface
123 angle
203 blocking beam
204 blocking portion
205 offset
206 stud

207 inflexion point
209 groove
211 longitudinal axis
281 round cross-section
301 base plate
303 rear side
305 flange
307 fastening hole
309 guide hole
311 front side
321 control groove
323 significantly curved region
325 slightly curved region
327 tilting zone
329 flat region
331 auxiliary guide
332 auxiliary guide
333 auxiliary guide
334 auxiliary guide
341 course
351 guide surface
352 guide surface
353 guide surface
354 guide surface
361 rebate
401 coupling piece
403 main body
405 stud
411 cross fitting
413 arm
414 head
415 arm
416 head
417 arm
421 pin
451 contact surface
452 contact surface
453 contact surface
454 contact surface
461 rib
481 rotational axis
501 hub
503 rear side
505 receiving hole
511 front side
521 feather key
531 shaft journal
561 collar
581 rotational axis
601 screw
701 turnstile system
705 wall
707 pillar
709 passage
711 turnstile
721 installation surface
801 base plate
811 front side
821 control groove
823 region
825 region
855 aperture
881 rotational axis
882 central hole
901 hub
911 front side
921 joint plate
923 pivot axis
981 rotational axis
982 stud
1001 blocking beam
1003 blocking portion
1005 offset
1007 hole
1009 coupling stud
1011 longitudinal axis
1021 connecting piece
1023 connection flange
1025 groove
1041 receiving piece
1043 slot
1045 receiving portion
1047 hole
1081 cross-section
1101 control ring
1201 roller
1301 bearing block
1303 main body
1307 annular groove
1401 lever
1447 hole
1451 guide bracket
1453 slide rail
1455 stud
1501 normal state
1503 vertical
1601 emergency unlocking state
1603 rotational angle

What is claimed is:

1. A device for separating persons in a separating region, the device comprising:

a holding apparatus which is installable in a stationary manner;

at least two blocking beams; and a rotational receiving portion which is rotatable in a rotational plane about a rotational axis relative to the holding apparatus, the rotational receiving portion comprising blocking beam receiving portions each of which is configured to receive one of the at least two blocking beams, wherein, each blocking beam receiving portion corresponds to one of the at least two blocking beams so that, when the rotational receiving portion rotates in the rotational plane about the rotational axis, one of the at least two blocking beams is pivoted out of the separating region and another one of the at least two blocking beams is pivoted into the separating region so as to thereby separate one person from an other person passing through the separating region, at least one of the at least two blocking beams comprises a respective coupling device on a rotational receiving portion side, the at least one of the at least two blocking beams is received in its corresponding blocking beam receiving portion in a movable manner relative to the rotational receiving portion, and the holding apparatus comprises a control guide for guiding the respective coupling device, the control guide mechanically corresponding to the respective coupling device, receiving the respective coupling device, and imparting an additional movement to the respective coupling device when the rotational receiving portion is rotated so that an additional movement relative to the rotational receiving portion is imparted to the at least one of the at least two blocking beams via the control guide, and the at least one of the at least two blocking beams is at least one of pivoted into the separating region with a delay and is pivoted out of the separating region in an accelerated manner.

2. The device as recited in claim 1, wherein the control guide comprises at least one of, an engraved design in the holding apparatus, and a protrusion which protrudes from the holding apparatus.

3. The device as recited in claim 2, wherein, the engraved design is provided substantially in a direction of the rotational axis as a groove-shaped depression, and/or the protrusion is a rib-shaped protrusion.

4. The device as recited in claim 2, wherein the control guide further comprises an alternating curvature along a control guide course.

5. The device as recited in claim 4, wherein the control guide further comprises an auxiliary guide which is configured to provide an assisted guidance to the respective coupling device, the auxiliary guide being in a supporting engagement with the respective coupling device, at points of singularity, and/or at curvature jumps, and/or in regions of small curvature of the control guide course, so as to thereby guide the respective coupling device in a supporting manner.

6. The device as recited in claim 1, wherein each of the blocking beam receiving portions comprises a joint for movably receiving the at least one of the at least two blocking beams.

7. The device as recited in claim 6, wherein the joint is at least one of, a rotary joint where a blocking beam rotational axis of the rotational receiving portion is arranged substantially in parallel with the rotational axis, and a swivel joint where a blocking beam swivel axis is arranged to be at least one of substantially in parallel with the rotational plane of the rotational receiving portion and substantially orthogonal to the rotational axis of the rotational receiving portion.

8. The device as recited in claim 7, wherein the respective coupling device comprises a rotary coupling guide that is arranged eccentrically to the blocking beam rotational axis so that, when the rotational receiving portion is rotated and when the rotary coupling guide of the respective coupling device is guided in the control guide, a rotational additional movement about the blocking beam rotational axis is imparted to the at least one of the at least two blocking beams.

9. The device as recited in either claim 7, wherein the respective coupling device comprises an extension of the at least one of the at least two blocking beams on a rotational receiving portion side so that, when the rotational receiving portion is rotated and when the extension of the respective coupling device on the rotational receiving portion side is guided in the control guide, a rotational additional movement about the blocking beam swivel axis is imparted to the at least one of the at least two blocking beams.

10. The device as recited in claim 1, wherein each of the at least two blocking beams comprises, a first blocking beam portion which is received in the blocking beam receiving portion, and a second blocking beam portion which is designed to be offset relative to the first blocking beam portion along a blocking beam longitudinal axis.

11. A person separating device comprising:

a main body;

a passage; and the device as recited in claim 1, wherein, the holding apparatus is installed on the main body so that, in an event of a rotation of the rotational receiving portion in the rotational plane about the rotational axis, one of the at least two blocking beams is pivoted out of the passage and another one of the at least two blocking beams is pivoted into the passage so that the separating region is formed in the passage.

12. The person separating device as recited in claim 11, wherein the rotational plane is arranged at an angle relative to a vertical plane.

13. The person separating device as recited in claim 12, further comprising:

a fastening element which is configured to be fastened to the main body, wherein, the angle relative to the vertical plane is 20° to 70°, and the holding apparatus is arranged on the fastening element which is inclined at the angle relative to the vertical plane.

14. The person separating device as recited in either claim 11, further comprising:

a drive which is assigned to the rotational receiving portion.

15. The person separating device as recited in either claim 14, further comprising:

a control device, wherein, the drive is an electrical drive, and the control device is configured to control the electrical drive so as to at least one of drive and block the rotational receiving portion about the rotational axis.

* * * * *